United States Patent [19]

Hardt et al.

[11] 4,105,711
[45] Aug. 8, 1978

[54] PVC MOULDING COMPOUNDS WITH HIGH DIMENSIONAL STABILITY TO HEAT

[75] Inventors: Dietrich Hardt, Cologne; Volker Serini; Hugo Vernaleken, both of Krefeld; Hans-Eberhard Braese, Cologne, all of Fed. Rep. of Germany

[73] Assignee: Bayer Aktiengesellschaft, Fed. Rep. of Germany

[21] Appl. No.: 626,354

[22] Filed: Oct. 28, 1975

Related U.S. Application Data

[63] Continuation-in-part of Ser. No. 540,982, Jan. 14, 1975, abandoned.

[30] Foreign Application Priority Data

Jan. 17, 1974 [DE] Fed. Rep. of Germany ....... 2402176

[51] Int. Cl.$^2$ .............. C08L 69/00; C08L 27/06; C08L 7/00; C08L 9/00
[52] U.S. Cl. .................. 260/873; 260/4 R; 260/827; 260/859 PV
[58] Field of Search .............. 260/874, 876 R, 873

[56] References Cited

U.S. PATENT DOCUMENTS

| | | | |
|---|---|---|---|
| 3,117,018 | 1/1964 | Strauss | 260/873 X |
| 3,305,605 | 2/1967 | Hostettler et al. | 260/873 |
| 3,663,471 | 5/1972 | Schirmer et al. | 260/876 R X |
| 3,780,141 | 12/1973 | Jin et al. | 260/873 X |
| 3,792,118 | 2/1974 | Kishikawa et al. | 260/873 |
| 3,809,729 | 5/1974 | Reinhard | 260/874 |
| 3,880,783 | 4/1975 | Serini et al. | 260/873 X |
| 3,882,192 | 5/1975 | Elghani et al. | 260/873 |
| 3,954,905 | 5/1976 | Margotte et al. | 260/873 |

Primary Examiner—Wilbert J. Briggs, Sr.
Attorney, Agent, or Firm—Connolly and Hutz

[57] ABSTRACT

Polymer mixtures consisting of:
(a) 20 – 90% by weight of a vinyl chloride polymer;
(b) 10 – 80% by weight of a polycarbonate in which at least 50% by weight of the structural units have the formula (1):

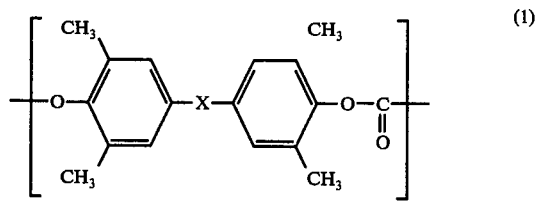

wherein X is a single bond, —O—, —CO—, —SO$_2$—, C$_1$–C$_{10}$ alkylene, C$_1$–C$_{10}$ alkylidene, C$_5$–C$_{15}$ cycloalkylene, C$_5$–C$_{15}$ cycloalkylidene, C$_5$–C$_{20}$ cycloalkyl alkylidene or

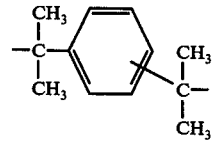

and
(c) up to 100% by weight, based on the mixture of (a) and (b) of a rubber.

9 Claims, No Drawings

PVC MOULDING COMPOUNDS WITH HIGH DIMENSIONAL STABILITY TO HEAT

CROSS-REFERENCE TO RELATED APPLICATION

This application is a continuation-in-part of application Ser. No. 540,982 filed Jan. 14, 1975 and now abandoned.

This invention relates to thermoplastic moulding compounds with high dimensional stability to heat and high impact strength produced from vinyl chloride polymers and certain polycarbonates. The moulding compounds may contain elasticizing components, such as rubbers and/or rubber modified thermoplastic resins, to increase their toughness and notched impact strength.

The freezing temperature (glass transition temperature) of polyvinyl chloride is about 80° C so that its dimensional stability to heat (Vicat temperatures about 75° to 84° C depending on the K-value and formulation) is insufficient for many purposes. Attempts have therefore been made to improve the dimensional stability to heat by modifying the molecular structure (copolymerisation), carrying out chemical after-treatments or adding thermoplasts with a higher glass transition temperature (G. Kühne et al, Kunststoffe Volume 63 (1973) pages 139–142). Partial successes have been achieved by after-chlorination and cross-linking as well as by copolymerisation with maleic imides (Vicat temperatures about 90° C). It has also been attempted to mix PVC with other thermoplasts. Technically valuable products, however, were obtained in only a few cases.

The moulding compounds according to the invention consist of:

(a) 20 – 90% by weight (based on (a) and (b)) of a vinyl chloride polymer;

(b) 10 – 80% by weight (based on (a) and (b)) of a polycarbonate in which at least 50% by weight of the structural units have the formula (1):

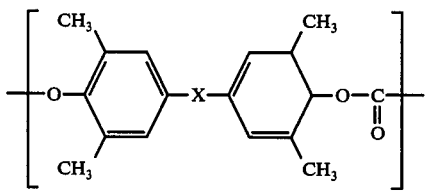

wherein X is a single bond, —O—, —CO—, —SO$_2$—, C$_1$–C$_{10}$ alkylene, C$_1$–C$_{10}$ alkylidene, C$_5$–C$_{15}$ cycloalkylene, C$_5$–C$_{15}$ cycloalkylidene, C$_5$–C$_{20}$ cycloalkylalkylidene,

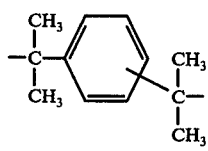

Additionally they may contain up to 100% by weight, preferably 10 – 50% by weight, based on the mixture of (a) and (b), of a rubber. Particularly preferred moulding compounds consist of:

(aa) 30 – 90% by weight of a vinyl chloride homo- or copolymer in which up to 30% by weight of other vinyl compounds have been polymerised;

(bb) 10 – 70% by weight of the polycarbonate defined under (b) preferably of a polycarbonate of the formula (2):

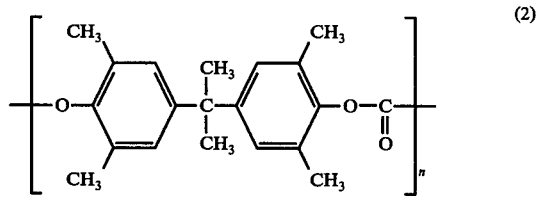

n = about 30 to 1000
or a polycarbonate in which at least 50% by weight of the structural units have the formula (2) and the remainder consists structural units of formula

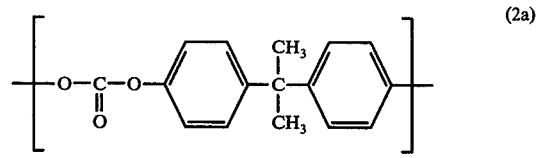

and (cc) 10 to 50% by weight, based on the mixture of (a) and (b) of a rubber.

The moulding compounds according to the invention may be prepared by dissolving their polymer components in suitable solvents and evaporating the solution or by mutual precipitation. If desired, the components may also be mechanically mixed by conventional methods.

Moulding compounds which have high impact strength and high notched impact strength, and in many cases, may also be transparent, may be obtained by the addition of rubbers or certain rubber-modified resins. Without the addition of rubber or rubber-modified resins the moulding compounds obtained, which may be transparent, have generally a lower impact strength.

Polycarbonates

Suitable polycarbonates according to the invention are homo- or co-polycarbonates and mixtures of various homo- and copolycarbonates. The polycarbonates generally have molecular weights of 10,000 to 200,000 (weight average molecular weight), preferably 20,000 to 80,000. They may be prepared, for example, by the interfacial polycondensation process from phosgene and bisphenols (see German OS Nos. 2,063,050; 2,063,052; 1,570,703; 2,211,956; 2,211,957 and 2,248,817 and French Pat. Nos. 1,561,518). The Polycarbonate units of formula (1) may, for example be based on the following bisphenols:

Bis-(3,5-dimethyl-4-hydroxyphenyl)
Bis-(3,5-dimethyl-4-hydroxyphenyl)-ether
Bis-(3,5-dimethyl-4-hydroxyphenyl)-carbonyl
Bis-(3,5-dimethyl-4-hydroxyphenyl)-sulphone
Bis-(3,5-dimethyl-4-hydroxyphenyl)-methane
1,1-Bis-(3,5-dimethyl-4-hydroxyphenyl)-ethane
1,1-Bis-(3,5-dimethyl-4-hydroxyphenyl)-propane
2,2-Bis-(3,5-dimethyl-4-hydroxyphenyl)-propane
2,2-Bis-(3,5-dimethyl-4-hydroxyphenyl)-butane 2,4-Bis-(3,5-dimethyl-4-hydroxyphenyl)-2-methylbutane
2,4-Bis-(3,5-dimethyl-4-hydroxyphenyl)-butane
3,3-Bis-(3,5-dimethyl-4-hydroxyphenyl)-pentane
3,3-Bis-(3,5-dimethyl-4-hydroxyphenyl)-hexane
4,4-Bis-(3,5-dimethyl-4-hydroxyphenyl)-heptane
2,2-Bis-(3,5-dimethyl-4-hydroxyphenyl)-octane
2,2-Bis-(3,5-dimethyl-4-hydroxyphenyl)-nonane
2,2-Bis-(3,5-dimethyl-4-hydroxyphenyl)-decane
1,1-Bis-(3,5-dimethyl-4-hydroxyphenyl)-cyclohexane
1,4-Bis-(3,5-dimethyl-4-hydroxyphenyl)-cyclohexane
α,α'-Bis-(3,5-dimethyl-4-hydroxyphenyl)-p-diisopropylbenzene
α,α'-Bis-(3,5-dimethyl-4-hydroxyphenyl)-m-diisopropylbenzene The following are preferred:
Bis-(3,5-dimethyl-4-hydroxyphenyl)-methane
2,2-Bis-(3,5-dimethyl-4-hydroxyphenyl)-propane
2,4-Bis-(3,5-dimethyl-4-hydroxyphenyl)-2-methylbutane
1,1-Bis-(3,5-dimethyl-4-hydroxyphenyl)-cyclohexane and
α,α'-Bis-(3,5-dimethyl-4-hydroxyphenyl)-p-diisopropylbenzene.

2,2-Bis-(3,5-dimethyl-4-hydroxyphenyl)-propane is particularly preferred.

In addition to units of formula (1), the polycarbonates may contain up to 50%, by weight, of units derived from other bisphenols, for example those in which at least one orthoposition of the phenyl groups is not substituted or substituted by halogen (e.g. chlorine or bromine). The following are examples:
Hydroquinone, resorcinol,
dihydroxydiphenyls,
Bis-(hydroxyphenyl)-alkanes,
Bis-(hydroxyphenyl)-cycloalkanes,
Bis-(hydroxyphenyl)-sulphides,
Bis-(hydroxyphenyl)-ethers,
Bis-(hydroxyphenyl)-ketones,
Bis-(hydroxyphenyl)-sulphoxides,
Bis-(hydroxyphenyl)-sulphones and
α,α'-Bis-(hydroxyphenyl)-diisopropylbenzenes.

The following are particularly preferred:
2,2-Bis-(4-hydroxyphenyl)-propane,
1,1-Bis-(4-hydroxyphenyl)-cyclohexane,
2,2-Bis-(3,5-dichloro-4-hydroxyphenyl)-propane,
2,2-Bis-(3,5-dibromo-4-hydroxyphenyl)-propane,
α,α'-Bis-(4-hydroxyphenyl)-p-diisopropylbenzene and
2,2-Bis-(3-methyl-4-hydroxyphenyl)-propane.

These and other aromatic dihydroxy compounds and the polycarbonates thereof have been described in U.S. Pat. Nos. 3,028,365; 2,999,835; 3,148,172; 3,271,368; 2,991,273; 3,271,367; 3,780,078; 3,014,891 and 2,999,846 and in German OS No. 1,570,703.

The polycarbonates may be branched by incorporating small quantities of polyhydroxyl compounds, e.g. 0.05 to 2.0 mol % (based on the quantity of bisphenols used). Polycarbonates of this type have been described, for example, in German OS Nos. 1,570,533; 2,116,974 and 2,113,347, GB PS Nos. 885,442 and 1,079,821 and U.S. Pat. Nos. 3,544,514. The following are some examples of suitable polyhydroxyl compounds: Phloroglucinol, 4,6-dimethyl-2,4,6-tri-(4-hydroxyphenyl)-heptene-(2), 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-(4,4'-dihydroxydiphenyl)-cyclohexyl]-propane, 2,4-Bis-(4-hydroxyphenyl-4-isopropyl)-phenol, 2,6-bis-(2'-hydroxy-5'-methylbenzyl)-4-methyl-phenol, 2,4-di-dihydroxybenzoic acid, 2-(4-hydroxyphenyl)-2-(2,4-dihydroxyphenyl)-propane and 1,4-bis-(4',4''-dihydroxy-triphenyl-methyl)-benzene.

The mixtures according to the invention may contain vinyl chloride polymers which have been obtained by emulsion, suspension or mass polymerisation and which have K-values, according to Fikentscher, of from 50 to 80 determined in cyclohexanone (1% solution at 23° C). Suitable vinyl chloride polymers of this type are polyvinyl chloride and copolymers of vinyl chloride obtained from at least 70%, by weight, of vinyl chloride and not more than 30%, by weight, of a vinyl compound. The following are examples of vinyl compounds which are suitable for copolymerisation with vinyl chloride: Vinylidene chloride and vinylidene fluoride, vinyl esters, such as vinyl acetate, vinyl propionate or vinyl benzoate, acrylic acid or methacrylic acid and alkyl esters thereof, amides and nitriles of acrylic and methacrylic acid, maleic acid esters and semiesters, maleic imides, vinyl ethers and olefinically unsaturated hydrocarbons, such as ethylene, propylene or butylene. Rechlorinated polyvinyl chloride is also suitable.

Rubber in the context of this invention means rubber and rubber modified with a thermoplastic resin. This latter will be termed modified rubber.

Suitable rubber is in particular, natural rubber and synthetic rubber. Synthetic rubber includes for example: Polypentenamer, ethylene-propylene-diene rubber (diene e.g. 1,5-hexadiene, norbornadiene, ethylidene norbornene), diene rubber, i.e. homopolymers of conjugated dienes containing 4 – 8 carbon atoms, such as butadiene, isoprene, piperylene and chloroprene, copolymers of such dienes with each other and copolymers of such dienes with styrene, acrylic or methacrylic compounds (e.g. acrylonitrile, methacrylonitrile, acrylic acid, methacrylic acid, butyl acrylate or methylmethacrylate) or isobutylene. Particularly preferred rubbers are polybutadiene, butadienestyrene copolymers, butadiene methylmethacrylate copolymers, butadiene-butyl acrylate copolymers, ethylene-propylene-diene rubber, polypentenamer and butadiene-acrylonitrile copolymer rubber, any of which can also contain small amounts of other copolymerised monomers, e.g. divinylbenzene and methacrylic acid. Elastomeric polyurethanes, silicone rubbers, polyether rubbers and chlorinated low pressure polyethylene with a chlorine content of 20 to 50% by weight, as well as copolymers of ethylene and vinyl acetate with a vinyl acetate content of 15 to 65% by weight, preferably 30 to 65% by weight are also suitable.

Suitable modified rubbers are e.g.
(A) Graft polymers of vinyl compounds (a) on rubbers (b); or
(B) Mixtures of graft polymers (A) and thermoplastic resins
  (c) which are prepared by the polymerisation of vinyl compounds (a); or
(C) Mixtures of rubbers (b) with thermoplastic resins (c).

The following are examples of suitable vinyl compounds (a):
1. Styrene and its derivatives, e.g. α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene and p-chloro-α-methylstyrene.

2. Acrylic and methacrylic compounds, e.g. acrylic and methacrylic acid, acrylonitrile, methacrylonitrile, methylmethacrylate, ethylacrylate, n- and iso-propylacrylate, n- and iso-butylacrylate, 2-ethylhexylacrylate, methylmethacrylate, ethylmethacrylate, n- and iso-propylmethacrylate, n- and iso-butylmethacrylate, cyclohexyl methacrylate and iso-bornylmethacrylate.
3. Vinyl chloride or vinyl monomers which may be copolymerised with vinyl chloride.

The resins and graft polymers may be prepared by conventional radical polymerisation, e.g. by solvent-free solution, solution/precipitation, suspension or emulsion polymerisation. The graft polymers or rubber and the resins may be mixed by conventional methods, e.g. on rollers or kneaders or by mixing suitable latices and then isolating the products by mutual precipitation.

The following modified rubbers are preferred: Graft polymers of styrene, α-methylstyrene, acrylonitrile, methacrylic acid esters or mixtures thereof on a rubber, e.g. polybutadiene or a butadiene copolymer and mixtures of such graft polymers with polystyrene or styrene copolymers.

In particular, the preferred modified rubbers have the following compositions:

I. Graft polymers of:
(I 1) 5 – 90%, by weight, preferably 10 – 60%, by weight, of a rubbery elastic butadiene polymer or copolymer containing up to 50%, by weight, of copolymerised styrene, acrylonitrile and/or alkylesters of acrylic or methacrylic acid containing 1 to 10 C atoms in the alcohol group as graft basis; and
(I 2) 10 – 95%, by weight, preferably 40 – 90%, by weight, of a monomer mixture of:
(I 2.1) 50 – 100 parts, by weight, of styrene, α-methylstyrene, $C_1 - C_{10}$ alkyl esters of acrylic and methacrylic acid or mixtures thereof;
(I 2.2) 0 – 50 parts, by weight, of acrylonitrile, methacrylonitrile, $C_1 - C_{10}$ alkyl esters of acrylic or methacrylic acid or mixtures thereof which are polymerised in the presence of (I 1).

II. Mixtures of:
(II 1) 5 – 80%, by weight, of polymer (I); and
(II 2) 20 – 95%, by weight of a thermoplastic polymer or copolymer of the monomers (I 2).

III. Mixtures of:
(III 1) 5 – 60%, by weight, of a rubber according to (I 1); and
(III 2) 40 – 95%, by weight, of a thermoplastic polymer according to (II 2).

Polycarbonates containing structural units of formula (1) are surprisingly highly compatible with polyvinyl chloride, with the result that the moulding compounds according to the invention have excellent physical properties. Some of the moulding compounds are surprisingly also transparent, particularly when polycarbonates based on 2,2-bis-(3,5-dimethyl-4-hydroxyphenyl)-propane or 2,4-bis-(3,5-dimethyl-4-hydroxyphenyl)-2-methylbutane are used. Polycarbonates containing structural units of formula (1), for example, those based on 2,2-bis-(3,5-dimethyl-4-hydroxyphenyl)-propane and 2,4-bis-(3,5-dimethyl-4-hydroxyphenyl)-2-methylbutane, may be dissolved together with PVC in a PVC solvent. No phase separation takes place. Polycarbonates based on bisphenol A do not have these properties.

Another surprising quality of the moulding compounds according to the invention is the ease with which they may be worked-up; thus, mixtures of polyvinyl chloride and, for example, polycarbonates based on o,o,o',o'-tetramethyl-substituted bisphenols may be worked-up thermoplastically at 240° – 260° C whereas the pure polycarbonate may be worked-up only at temperatures upwards of about 300° – 330° C.

The moulding compounds according to the invention have surprisingly high heat distortion temperatures. Vicat temperatures according to DIN 53 460 (5 kp) of 130° – 135° C are obtained with polycarbonate contents of about 50%, by weight. Compared with polyvinyl chloride, the moulding compounds are distinctly improved in their hardness, tensile strength, flexural strength and E-modulus.

Regardless of the proportions in which the components are mixed, some moulding compounds are to a large extent transparent, particularly when polycarbonates based on 2,2-bis-(3,5-dimethyl-4-hydroxyphenyl)-propane and 2,4-bis-(3,5-dimethyl-4-hydroxyphenyl)-2-methylbutane are used.

Moulding compounds prepared from polyvinyl chloride and the polycarbonates described above, however, have not a sufficient impact strength for all purposes.

The toughness and notched impact strength, may, however, be considerably improved by adding rubber or modified rubber.

This normally destroys the transparency of a moulding compound so that more or less opaque products are obtained. In the transparent moulding compounds according to the invention it is surprisingly found that the transparency is preserved after the addition of rubber or modified rubber which in fact have practically the same refractive index as the moulding compound.

The moulding compounds according to the invention are considerably more flame resistant than pure polycarbonates and substantially resistant to acids, alkalies and solvents.

In the polymer mixtures according to the invention, the rubber generally forms a separate phase which is finely divided in the polymer mixture.

The rubber may be in the form of individual pellets or agglomerates of pellets or in the form of other regular or irregular particles and agglomerates or also in the form of network-like particles in which another polymer is embedded. The particles generally measure 0.01 to 20μm, preferably 0.03 to 10 μm. They may consist of one or more different types, depending on the method employed for preparing the polymer mixture and the choice of individual components, and the individual types of particles may differ very substantially from each other in form, size and distribution of particle size. Two polymer mixtures having the same rubber content and otherwise identical in composition may differ substantially from each other in their properties due to differing rubber phases, for example they may differ in their toughness and surface gloss.

Whereas the rubber content generally forms a separate phase in the polymer mixtures according to this invention, the other polymer components of the mixture may form a common phase in which the various polymers may be almost molecularly dispersed or they may form several phases. Each of these several phases may consist of an almost molecularly dispersed mixture of various polymers.

The moulding compounds according to the invention may be obtained by mixing the polycarbonate with polyvinyl chloride with the addition of a conventional stabilizer system followed by homogenisation on mixing apparatus, such as rollers, mixing screws, mixing extruders, internal mixers or kneaders. Owing to the operating temperature of up to 260° C employed, it is advisable to add the total quantity of stabilizer required to the polyvinyl chloride and mix vigorously in a high speed mixer (temperature up to 150° C) before the polyvinyl chloride is mixed with the polycarbonate. For example, the polyvinyl chloride may be added as a stabilized granulate to the usually pulverulent or granular polycarbonate, and this mixture may then be homogenized. Alternatively, the two polymers may be melted separately, for example in extruders, and the two melts may then be combined, or the polycarbonate or polyvinyl chloride may first be melted separately, e.g. on rollers, and the second component may then be added.

The moulding compounds according to the invention may also be prepared from solutions by dissolving their components in a solvent or solvent mixture and then isolating them together by the addition of a non-solvent or by pouring the solution dropwise into a precipitating agent or by evaporating the solvent.

The moulding compounds may be worked-up as powders or granulates to product shaped products of all kinds by the conventional thermoplastic processing methods.

Rubber (or modified rubber) is in most cases obtained in a pulverulent crumbly form and may be used as such without special preliminary measures for the mixing or thermoplastic homogenization process. If desired, however, the polyvinyl chloride or polycarbonate may first be mixed with the resin. The moulding compounds according to the invention may be stabilised based on lead, barium/cadmium, calcium/zinc, organo tin compounds or organic polyvinyl chloride stabilizers used either singly or in combination. The choice of lubricants also depends on the requirements of the polyvinyl chloride. The stabilisation of polyvinyl chloride is particularly important because, depending on the polycarbonate content, the processing temperatures of the moulding compounds are close to the upper limit permissible for polyvinyl chloride. In many cases, it will be necessary to use a higher total concentration of stabiliser than for pure polyvinyl chloride.

The addition of colour pigments, fillers, glass fibres, antistatic agents, fire retarding agents and plasticizers is possible in principle for achieving particular properties or effects.

Physical or chemical blowing agents can also be added to the moulding compounds according to the invention in order to produce a foam structure under suitable operating conditions.

The operating temperatures required for the premixing process, i.e. the incorporation of polyvinyl chloride stabilizer and if indicated homogenization of the total mixture before it is subjected to heat in the high speed mixer, are from 20° to 150° C. The subsequent processing of the product into a granulate or shaped article should preferably be at a temperature not over 260° C, the temperature required depending on contents and viscosity of the polycarbonate. With relatively low polycarbonate contents of up to about 30%, the product may be worked-up in much the same way as polyvinyl chloride with a high K-value, but if the proportion of polycarbonate is high the temperatures employed are likely to be higher. Owing to the resulting hither thermal stress, the total time employed for working-up the product should be kept as short as possible even if the product has been satisfactorily stabilized.

The moulding compounds according to the invention constitute a class of chemical materials which have the widest practical applications. As examples may be mentioned the manufacture of plates, sections and tubes, particularly for the building industry, where the high heat distortion temperature is particularly important. In this field, not only is it possible to compensate for the deleterious effect on the heat distortion temperature of polyvinyl chloride by using impact strength modifiers but also the inclusion of the polycarbonate opens up new fields of application for polyvinyl chloride which, while having the advantage of low cost, could previously not be used on account of the low dimensional stability to heat. The material may also be used in the packaging industry in the form of bottles, containers and foils which, in contrast to polyvinyl chloride, may be brought into contact with hot contents. There are also numerous possible uses of the material in the form of injection moulded articles for particular purposes where extreme dimensional stability to heat is required in addition to high transparency. The high resistance of the moulding compounds to hydrolysis enables them to be used in the construction of chemical apparatus, as storage containers for acids and alkalies and ventilating systems for corrosive waste gases. In the electrical field, the high tracking resistance of the material comes into its own. The application of the material from solution by casting, spread coating or printing for the manufacture of coatings or foils should also be mentioned as a possible use.

EXAMPLES

To produce the moulding compounds described in the Examples, a stabilized polyvinyl chloride mixture is first prepared and then worked-up into a homogeneous mass with the polycarbonates or other components on rollers. The individual products are prepared as follows:

A. Polyvinyl chloride

100 Parts, by weight, of suspension polyvinyl chloride with a K-value of 68 are mixed for 5 minutes in a high speed mixer at 2000 revs/min with the addition of a stabilizer system consisting of:

6 parts, by weight, of di-n-octyl-tin-dithioglycollic acid ester,
1.5 parts, by weight, of stearyl stearate,
1.0 parts, by weight, of distearylphthalate,
0.3 parts, by weight, of montanic acid ester and
0.2 parts, by weight, of polyethylene wax.

The temperature rises to 120° C. The mixture is then cooled to room temperature while the speed of the mixer is reduced (about 500 revs/min).

The resulting polyvinyl chloride mixture is found to have the following mechanical properties:

| | | |
|---|---|---|
| Ball pressure hardness DIN 53 456 kp/cm$^2$ | | 1317 |
| Impact strength DIN 53 453 cmkp/cm$^2$ | | |
| | RT | 10 samples not broken |
| | −20° C | 3/10 broken |
| | −40° C | 42 |
| Notched impact strength DIN 53 453 cmkp/cm$^2$ | | |
| | RT | 2 |
| Vicat DIN 53 460° C | 1 kp | 86 |
| | 5 kp | 74 |
| Bending stress DIN 53 452 | | 950 |
| Sagging mm | | 3.8 |
| Tensile strength DIN 53 455 kp/cm$^2$ | | 653 |

| | |
|---|---|
| Elongation DIN 53 455% | 4 |

B. Polycarbonate

Polycarbonate based on 2,2-bis-(3,5-dimethyl-4-hydroxyphenyl)-propane in powder form. The relative viscosity is $\eta_{rel} = 1.30$(determined on a solution of 0.5 g of the polycarbonate in 100 ml of methylene chloride).

C. Modified rubber I.

A graft polymer of 50 parts, by weight, of polybutadiene, 36 parts, by weight, of styrene and 14 parts, by weight, of acrylonitrile.

D. Modified rubber II.

Graft polymer of 30 parts, by weight, of polybutadiene, 45 parts, by weight, of styrene and 25 parts, by weight, of methyl methacrylate.

EXAMPLE 1

80 Parts, by weight, of polyvinyl chloride mixture A are first mixed with 20 parts, by weight, of polycarbonate B for one minute in a high speed mixer at about 1500 revs/min and then homogenized on laboratory rollers for a total of 5 minutes. The roller temperature is 260° C. A continuous transparent sheet is obtained. This sheet is then preheated without pressure in a high pressure press at 210° C for 3 minutes and then pressed for a further 3 minutes under pressure to form a plate from which test samples are formed. The plates obtained are transparent. Their mechanical data are given in Table 1.

EXAMPLES 2 – 5

Mixtures are prepared from the following components as described in Example 1:

| | |
|---|---|
| 65 parts, by weight, of A + 35 parts, by weight, of B | (2) |
| 50 parts, by weight, of A + 50 parts, by weight, of B | (3) |
| 35 parts, by weight, of A + 65 parts, by weight, of B | (4) |
| 20 parts, by weight, of A + 80 parts, by weight, B | (5) |

Moulding compounds of high transparency are obtained in all cases. The mechanical properties are shown in Table 1.

EXAMPLE 6

50 Parts, by weight, of polycarbonate A are dissolved in methylene chloride and 50 parts, by weight, of suspension polyvinyl chloride with a K-value of 68 are dissolved in cyclopentanone. The solutions are combined with stirring. The polymer mixture is precipitated by introducing the solution dropwise into methanol. The finely divided polymer mixture is dried for 20 hours at 60° C and 15 hours at 80° C under vacuum.

To work-up the product, 100 parts, by weight, of the precipitated polymer mixture is mixed with the stabilizer and lubricant system described in Example 1 in the high speed mixer also described in Example 1 and the resulting mixture is homogenized on a roller for 5 minutes at 240° C. The rolled sheet obtained is transparent and is worked-up into pressed plates as described above. The mechanical properties of the plates are shown in Table 1.

EXAMPLES 7 – 12

Polyvinyl chloride (A), polycarbonate (B) and rubber (D) are mixed as follows by the method described in Example 1:

| | |
|---|---|
| 40 Parts, by weight, of A + 50 parts, by weight, of B + 10 parts, by weight, of D | (7) |
| 43 parts, by weight, of A + 45 parts, by weight, of B + 12 parts, by weight, of D | (8) |
| 35 parts, by weight, of A + 50 parts, by weight, of B + 15 parts, by weight, of D | (9) |
| 30 parts, by weight, of A + 50 parts, by weight, of B + 20 parts, by weight, of D | (10) |
| 65 parts, by weight, of A + 23 parts, by weight, of B + 12 parts, by weight, of D | (11) |
| 23 parts, by weight, of A + 65 parts, by weight, of B + 12 parts, by weight, of D | (12) |

The resulting moulding compounds are transparent and in addition to the great hardness and flexural strength described above they are distinguished by high toughness and notched impact strength. The mechanical properties are shown in Table 2.

EXAMPLES 13 – 17

Opaque moulding compounds are produced in the same way as in Examples 7 – 12 but using rubber C:

| | |
|---|---|
| 40 Parts, by weight, of A + 50 parts, by weight, of B + 10 parts, by weight, of C | (13) |
| 35 parts, by weight, of A + 50 parts, by weight, of B + 15 parts, by weight, of C | (14) |
| 30 parts, by weight, of A + 50 parts, by weight, of B + 20 parts, by weight, of C | (15) |
| 23 parts, by weight, of A + 65 parts, by weight, of B + 12 parts, by weight, of C | (16) |
| 70 parts, by weight, of A + 18 parts, by weight, of B + 12 parts, by weight, of C | |

The mechanical properties are shown in Table 3.

Table 1:

| Property | Test Method | unit | 1 | 2 | 3 | 4 | 5 | 6 |
|---|---|---|---|---|---|---|---|---|
| Ball pressure hardness 30" | DIN 53456 | kp/cm$^2$ | 1527 | 1587 | 1643 | 1471 | 1645 | 1567 |
| Impact strength +20° C | DIN 53 453 | cmkp/cm$^2$ | x | x | 52 | 25 | 21 | 6/10 |
| −20° C | | | 8/10 | 37 | 29 | 26 | 21 | 27 |
| Notched impact strength +20° C ± 0° C −20° C | DIN 53 453 | cmkp/cm$^2$ | 3 | 3 | 3 | 2 | 3 | 3 |
| Dimensiona; stability in the heat according to | DIN 53 460 | ° C | 88 | 104 | 138 | 163 | 180 | 125 |

Table 1:-continued

| Property | Test Method | unit | 1 | 2 | 3 | 4 | 5 | 6 |
|---|---|---|---|---|---|---|---|---|
| Vicat 5 kp Bending stress $\delta_{bF}$ | DIN 53 452 | kp/cm$^2$ | 1078 | 1132 | 1223 | 1287 | 1375 | 1080 |
| Sagging $f_B$ | DIN 53 452 | mm | 4.2 | 5.0 | 5.4 | 6.0 | 5.3 | 5.4 |
| Tensile strength $\delta_S$ | DIN 53 455 | kp/cm$^2$ | 707 | 711 | 758 | 821 | — | 710 |
| Elongation $\epsilon_S$ | DIN 53 455 | % | 3.5 | 3.9 | 4.6 | 4.8 | — | 8 |
| E-modulus Bending/tension | DIN 53 457 | kp/cm$^2$ | 30,200 | 31,500 | 32,000 | 30,000 | 28,000 | | impact strength: x = no samples broken fraction: $\frac{\text{number of broken samples}}{\text{number of tested samples}}$ remaining figures: average volume of cmkp/cm$^2$ for 10 samples

Table 2:

| Property | Test Method | unit | 7 | 8 | 9 | 10 | 11 | 12 |
|---|---|---|---|---|---|---|---|---|
| Ball pressure hardness 30" | DIN 53 456 | kp/cm$^2$ | 1305 | 1275 | 1284 | 1205 | 1097 | 1309 |
| Impact strength +20° C | DIN 53 453 | cmkp/cm$^2$ | x | x | x | x | x | 8/10 |
| −20° C | | | 5/10 | 8/10 | 8/10 | 2/10 | X | |
| Notched impact strength +20 C | DIN 53 453 | cmkp/cm$^2$ | 7 | 13 | 18 | 18 | 22 | 8 |
| ± 0° C | | | 5 | 7 | 12 | 15 | 12 | 7 |
| −20° C | | | — | 4 | 5 | 7 | 6 | 5 |
| Dimensional stability in the heat according to | DIN 53 460 | °C | 126 | 117 | 128 | 129 | 86 | 158 |
| Vicat 5 kp Bending stress $\delta_{bF}$ | DIN 53 452 | kp/cm$^2$ | 1030 | 999 | 1005 | 948 | 885 | 1121 |
| Sagging $f_B$ | DIN 53 452 | mm | 5.1 | 5.3 | 5.3 | 5.4 | 4.4 | 5.2 |
| Tensile strength $\delta_S$ | DIN 53 455 | kp/cm$^2$ | 620 | 617 | 611 | 566 | 527 | 655 |
| Elongation $\epsilon_S$ | DIN 53 455 | % | 4.0 | 4.1 | 4.2 | 4.0 | 3.4 | 4.5 |
| E-modulus Bending/tension | DIN 53 457 | kp/cm$^2$ | 26,800 | 28,300 | 25,000 | 24,500 | | |

Table 3:

| Property | Test Method | unit | 13 | 14 | 15 | 16 | 17 |
|---|---|---|---|---|---|---|---|
| Ball pressure Hardness 30" | DIN 53 456 | kp/cm$^2$ | 1356 | 1240 | 1128 | 1343 | 1128 |
| Impact strength +20° C | DIN 53 453 | cmkp/cm$^2$ | 2/10 | x | x | 7/10 | x |
| −20° C | | | 4/10 | 5/10 | 4/10 | | |
| Notched impact strength +20° C | DIN 53 453 | cmkp/cm$^2$ | 9 | 17 | 17 | 10 | 24 |
| ± | | | 5 | 13 | 14 | 9 | 11 |
| −20° C | | | 4 | 11 | 12 | 9 | 7 |
| Dimensional stability in the heat according to | DIN 53 460 | °C | 122 | 126 | 130 | 159 | 85 |
| Vicat 5 kp Bending stress $\delta_{bF}$ | DIN 53 452 | kp/cm$^2$ | 1655 | 955 | 937 | 1119 | 860 |
| Sagging $f_B$ | DIN 53 452 | mm | 5.5 | 5.7 | 5.7 | 5.5 | 4.2 |
| Tensile strength $\delta_S$ | DIN 53 455 | kp/cm$^2$ | 627 | 605 | 538 | 632 | 527 |
| Elongation $\epsilon_S$ | DIN 53 455 | % | 3.8 | 3.6 | 3.5 | 4.1 | 2.9 |
| E-modulus Bending/tension | DIN 53 457 | kp/cm$^2$ | 28,000 | 26,200 | 24,300 | | |

We claim:

1. A polymer mixture comprising:
   (a) from 20 - 90% by weight, based on the mixture of (a) and (b), of a vinyl chloride polymer;
   (b) from 10 - 80% by weight, based on the mixture of (a) and (b), of a polycarbonate having at least 50% by weight of structural units of the formula

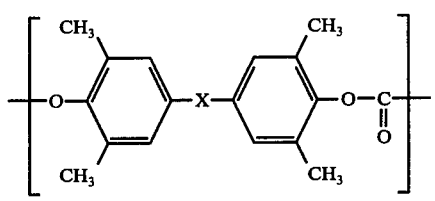

(1)

wherein X is a single bond, —O—, —CO—, —SO$_2$—, C$_1$–C$_{10}$ alkylene, C$_1$–C$_{10}$ alkylidene, C$_5$–C$_{10}$ cycloalkylene, C$_5$–C$_{15}$ cycloalkylidene, C$_5$–C$_{20}$ cycloalkylalkylidene or the group

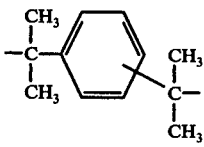

2. A polymer mixture according to claim 1, which additionally contains up to 100% by weight based on (a) and (b) of a rubber.

3. A mixture as claimed in claim 1 comprising:
   (aa) from 30 – 90% by weight of a vinyl chloride homo- or copolymer which contains up to 30% by weight of at least one other vinyl compound;
   (bb) from 10 – 70% by weight of a polycarbonate of the formula

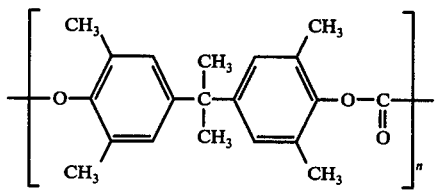
(2)

wherein $n = 30 - 100$
or of a polycarbonate having at least 50% by weight of structural units of formula (2), the remainder consists of structural units of formula (2 a)

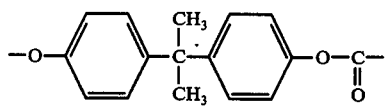
(2a)

and
   (c) from 10 – 50% by weight, based on the mixture of (a) and (b) of a rubber.

4. A mixture as claimed in claim 1 in which the polycarbonate (b) contains exclusively structural units of formula (1).

5. A mixture as claimed in claim 1 in which X is

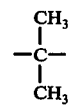

6. A mixture as claimed in claim 1 in which up to 50% of the structural units of the polycarbonate (b) are derived from at least one member of the group consisting of
2,2-bis-(4-hydroxyphenyl)-propane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane,
α,α'-bis-(4-hydroxyphenyl)-p-diisopropylbenzene and
2,2-bis-(3-methyl-4-hydroxyphenyl)-propane.

7. A mixture as claimed in claim 1 in which component (a) has a K-value of from 50 to 80.

8. A mixture as claimed in claim 1 in which component (a) contains up to 30% by weight of at least one member of the group consisting of:
   vinyl acetate, vinyl propionate, vinyl benzoate, acrylic and methacrylic acid esters containing 1 – 10 carbon atoms in the alcohol group, maleic acid esters and semi-esters, ethylene propylene, vinyl ethers, acrylonitrile, maleic imides and vinylidene chloride.

9. A mixture as claimed in claim 2 in which the rubber is a modified rubber consisting of a graft polymer prepared by polymerising styrene, α-methylstyrene, acrylonitrile, methacrylonitrile, acrylic or methacrylic acid alkyl esters containing 1 – 10 carbon atoms in the alcohol group or mixtures thereof in the presence of a polybutadiene or a copolymer of butadiene with styrene, α-methylstyrene, acrylonitrile, methacrylonitrile or acrylic or methacrylic acid esters containing 1 – 10 carbon atoms in the alcohol group.

* * * * *